United States Patent
Nakashima et al.

(10) Patent No.: US 7,201,544 B2
(45) Date of Patent: Apr. 10, 2007

(54) DEEP HOLE BORING DRILL

(75) Inventors: Kazuhiro Nakashima, Kikuchi-gun (JP); Koichi Tsuzaki, Kikuchi-gun (JP); Norihiro Masuda, Toyokawa (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/547,826

(22) PCT Filed: Feb. 27, 2004

(86) PCT No.: PCT/JP2004/002339

§ 371 (c)(1),
(2), (4) Date: Oct. 3, 2005

(87) PCT Pub. No.: WO2004/078393

PCT Pub. Date: Sep. 16, 2004

(65) Prior Publication Data

US 2006/0099042 A1    May 11, 2006

(30) Foreign Application Priority Data

Mar. 5, 2003 (JP) .............................. 2003-059035

(51) Int. Cl.
*B23B 51/02* (2006.01)

(52) U.S. Cl. .................. 408/230; 408/211; 408/224; 408/225

(58) Field of Classification Search ............ 408/211, 408/230, 227, 145, 223
See application file for complete search history.

(56) References Cited

U.S. PATENT DOCUMENTS

| | | | | | |
|---|---|---|---|---|---|
| 2,332,295 | A | * | 10/1943 | Bouchal | 408/211 |
| 2,652,083 | A | * | 9/1953 | Emmons | 408/211 |
| 3,977,807 | A | * | 8/1976 | Siddall | 408/223 |
| 3,991,454 | A | * | 11/1976 | Wale | 407/56 |
| 4,756,650 | A | * | 7/1988 | Wakihira et al. | 408/230 |
| 5,046,902 | A | * | 9/1991 | Zubov et al. | 408/230 |
| 5,272,940 | A | * | 12/1993 | Diskin | 76/108.6 |
| 5,486,075 | A | * | 1/1996 | Nakamura et al. | 408/230 |
| 5,846,035 | A | * | 12/1998 | Karafillis et al. | 408/1 R |
| 6,113,321 | A | * | 9/2000 | Mulroy et al. | 408/211 |

(Continued)

FOREIGN PATENT DOCUMENTS

JP    57156109 A * 9/1982

(Continued)

*Primary Examiner*—Dana Ross
(74) *Attorney, Agent, or Firm*—Rankin, Hill, Porter & Clark LLP

(57) ABSTRACT

A drill for producing a deep hole that does not produce a bend of the hole during cutting. A drill body is spirally provided with a pair of cutting edges. The cutting edges are spaced at about 180 degrees apart around a core of the drill and the edge line of a tip section of the cutting edges is depressed toward the core of the drill. When the outside dimension of the drill is 7.4 mm, an angle between the edge line and a line perpendicular to the core is 5 degrees and the core thickness (t) is 2.96 mm. Further, the drill is provided with a guide section for preventing bending during a cutting operation. The guide section is provided on a heel side on the same circumference as that on which the outer end section of the cutting edges passes.

8 Claims, 3 Drawing Sheets

U.S. PATENT DOCUMENTS

| | | | |
|---|---|---|---|
| 6,132,149 A * | 10/2000 | Howarth et al. | 408/230 |
| 6,443,674 B1 * | 9/2002 | Jaconi | 408/1 R |
| 6,857,832 B2 * | 2/2005 | Nygård | 408/211 |

FOREIGN PATENT DOCUMENTS

| | | |
|---|---|---|
| JP | 60-114407 | 6/1985 |
| JP | 60177807 A * | 9/1985 |
| JP | 61-28654 | 8/1986 |
| JP | 62-188613 | 8/1987 |
| JP | 02-237710 | 9/1990 |
| JP | 05-253718 | 10/1993 |
| JP | 6-18710 | 3/1994 |
| JP | 06-254711 | 9/1994 |
| JP | 07-040118 | 2/1995 |
| JP | 7-33516 | 6/1995 |

* cited by examiner (a)

(b)

(c)

DEEP HOLE BORING DRILL

TECHNICAL FIELD

The present invention relates to a drill for producing a deep hole in a cylinder block, a crankshaft, and the like of an engine.

BACKGROUND ART

One example of a drilling tool is proposed in each of the following documents.

Japanese Utility Model Publication No. Hei 6.18710 discloses a tapping screw having a drill cutting edge provided at the tip section and an end mill cutting edge formed next to the drill cutting edge. In this prior art, the tip section of the drill cutting edge is formed to cause the core section to protrude in the axial direction.

Japanese Utility Model Publication No. Hei 6-254711 discloses an end mill of which the tool body is provided with first and second flutes, wherein the first flute is provided with a first peripheral tip and a central tip, while the second flute is provided with a second peripheral tip. In this prior art, the cutting edge lines of a tip section of the first and second peripheral tips are formed to be depressed toward the tool core.

The difference between the drill and the end mill is now clarified. The drill has the cutting edge only on the tip and is used for drilling and chamfering operations. On the other hand, the end mill has an end cutting edge and a peripheral cutting edge and can be used for drilling, grooving and a side cutting operation, but a shallow hole can only be made because the tip room is narrow.

Japanese Utility Model Publication No. Hei 7-40118 discloses a drill of which the spiral angle of the cutting edge is gradually decreased toward a shank. In this prior art, it is shown that the tip edge line of the cutting edge is depressed.

FIG. 5 explains an example in which a deep hole is made in a cylinder block with a conventional drill (point angle: 118 degrees) of which the tip of the cutting edge is projecting. As shown in FIG. 5 (a), the cylinder block is formed with a lower hole (i.e., a mold-release hole) in the case of casting. If cutting proceeds in such a condition in which the center of the lower hole is not in line with the core of the drill, a difference is caused in the radial force even though a cutting force received from the cutting surface is the same as shown in FIG. 5 (b). As a result, a sudden hole-bending may be generated as shown in FIG. 5 (c).

On the other hand, when the tip section of the cutting edge is formed to have a depressed shape, the bending can be reduced because the tip section does not follow the lower hole in the case of cutting and the rectilinear propagation is good. However, bending is readily generated when the hole to be cut is deep because there is still a difference in the radial force.

DISCLOSURE OF THE INVENTION

To solve the above-mentioned problem, according to the present invention, there is provided a drill for making a deep hole in which the edge line of a tip section of a spiral cutting edge is depressed toward the core of the drill and a guide section is provided on a heel side on the same circumference as that on which the outer end section of the cutting edge passes in the tip section of the drill.

In this manner, by providing the guide section, the drill is supported at four points including the cutting edges and as a result, bending in the case of making the deep hole can be controlled. It is also possible to provide the guide section with a diamond edge.

Further, to improve the rectilinear propagation of the drill without following the lower hole, it is desirable that the concave angle of the tip section of the cutting edge be between 0 and 10 degrees, for example, be about 5 degrees.

Still further, the standard core thickness of the drill having a general outside dimension of 7.4 mm (=D) is 1.48 mm or less (0.2 D). However, in this case, the core thickness is overcome or affected by the radial force produced in the case of producing the deep hole and as a result, bending is readily produced. It is therefore desirable that the core thickness be 2.22 mm (0.3 D) or more, for example, be about 2.96 mm (0.4 D).

BEST MODE FOR CARRYING OUT THE INVENTION

Figure 1:
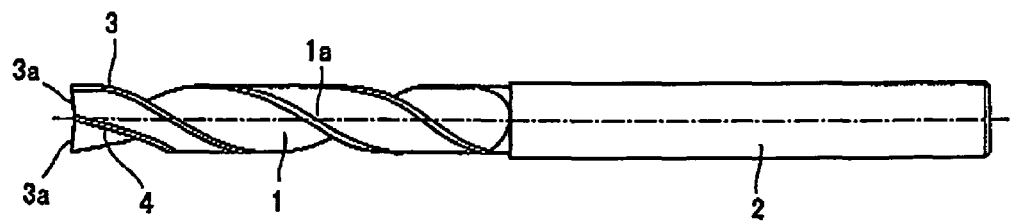
FIG. 1 is a sectional view of a drill for making a deep hole according to the present 10 invention.
Figure 2:
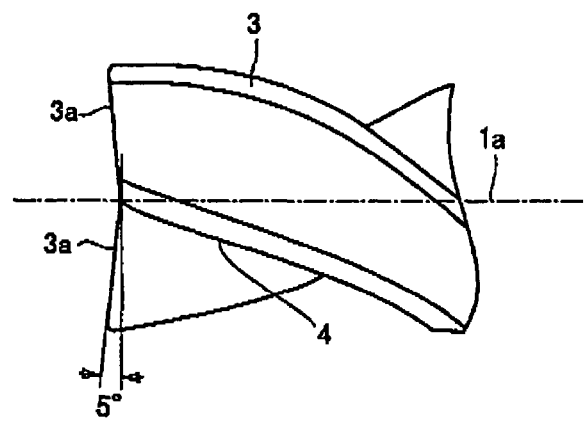
FIG. 2 is an enlarged view of a tip section of the drill for making a deep hole according to the present invention.
Figure 3:
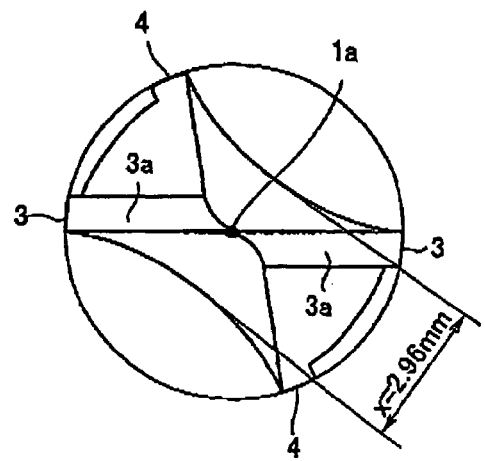
FIG. 3 is an end view of e tip section of the drill for making a deep hole according to the present invention.

Preferred embodiments of the present invention will now be described with reference to the accompanying drawings. FIG. 1 is a sectional view of a drill for making a deep hole according to the present invention. FIG. 2 is an enlarged view of a tip section of the drill for making a deep hole according to the present invention. FIG. 3 is an end view of the tip section of the drill for making a deep hole according to the present invention.

A drill for producing a deep hole comprises a drill body 1 and a shank 2. The drill body 1 is spirally provided with a pair of cutting edges 3. The cutting edges 3 are formed at opposing positions spaced apart by about 180 degrees around a core 1a of the drill and the edge lines of the tip section of the cutting edges 3 are depressed toward the core 1a of the drill. An angle formed between the edge line 3a (the edge line of the cutting edges 3 in the outer end section) and the line perpendicular to the core 1a is 5 degrees. In the figure shown here, the core thickness (t) is 2.96 mm (0.4 D).

The drill according to the present invention is further provided with a guide section 4 for preventing bending in the case of cutting. The guide section 4 is provided on a heel side on the same circumference as that on which the outer end section of the cutting edges 3, 3 passes. In this manner, a stable cutting operation can be performed by four point support of the cutting edges 3, 3 and the guide sections 4, 4.

Figure 4:
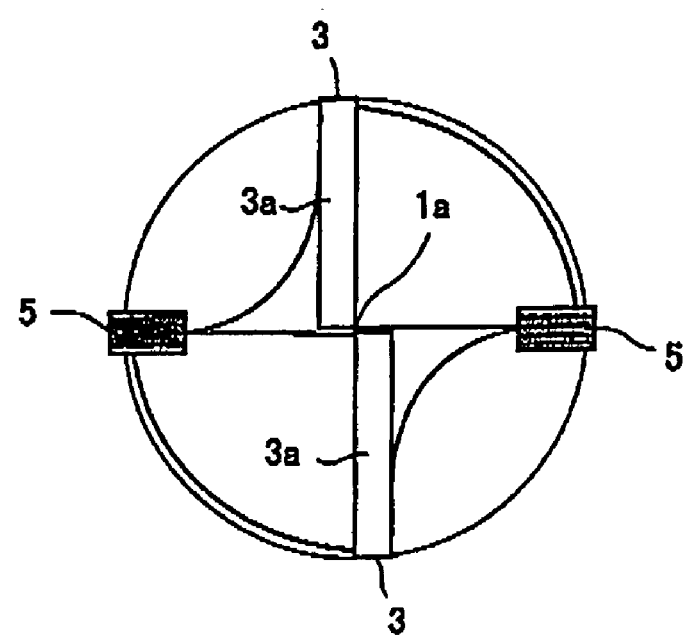
FIG. 4 is an end view similar to FIG. 3 showing another embodiment (with a diamond cutting edge provided)
Figure 5:
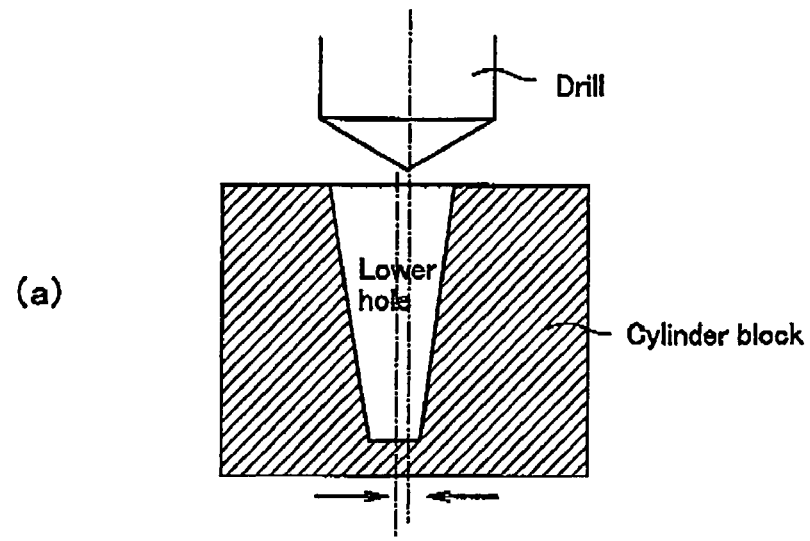
FIG. 5 (a) through (c) are views explaining a conventional problem.
Figure 5:
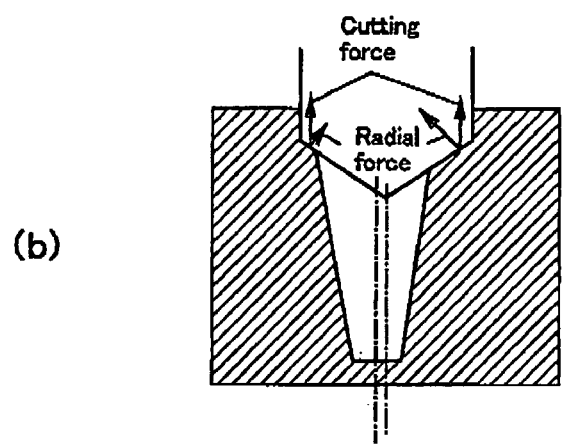
Figure 5:
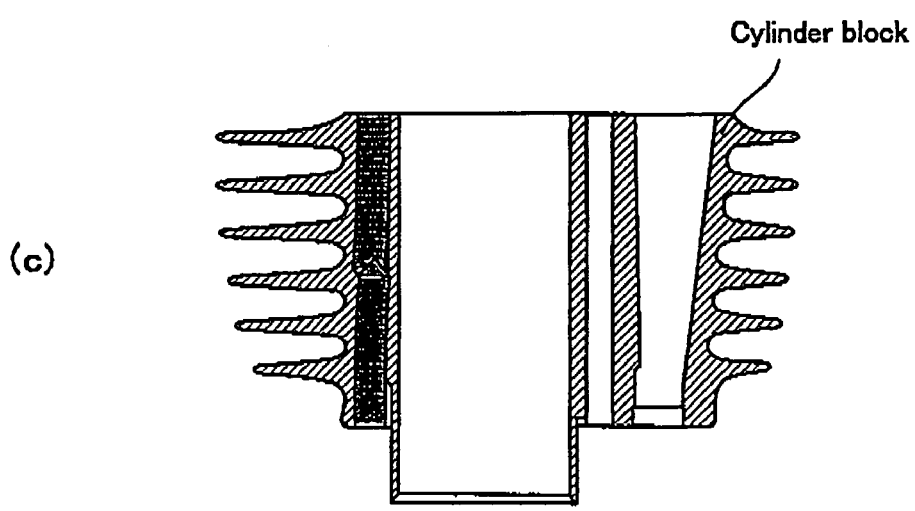

FIG. 4 shows another embodiment in a view similar to FIG. 3. In this embodiment, diamond edges 5, 5 are provided at the tip section of the guide sections 4, 4 to have a structure that can be diverted to a reaming operation.

INDUSTRIAL APPLICABILITY

As described above, the drill according to the present invention is provided with the guide section so that the drill can have a self-guide function and the tip section of the cutting edge is depressed toward the core so as not to follow the lower hole for smooth rectilinear propagation. Further, since the core thickness is increased for higher rigidity, generation of bending can be prevented even though a difference is caused in the radial force by the displacement between the center of the lower hole and the core of the drill when a deep hole is made in a crank shaft, a cylinder block and the like.

The invention claimed is:

1. A drill for producing a deep hole, comprising:
    a core having a distal end;
    a spiral cutting edge formed around the core and having an edge line, wherein a tip section of said spiral cutting edge is formed at the distal end of the core and the edge line at the tip section is depressed toward the core of the drill such that said core distal end is recessed relative to a circumferential portion of said edge line tip section and such that said spiral cutting edge tip section defines a distalmost end of said drill, said edge line defining two support points; and
    a guide section formed on the core, said guide section being provided on a heel side and on a same circumference as that on which the circumferential portion of the cutting edge tip section passes, and wherein said guide section defines two support points that cooperate with the support points provided by said edge line so that the drill provides a four point contact with a material to be drilled.

2. The drill for producing a deep hole according to claim 1, wherein a concave angle of the depressed tip section of the cutting edge is between 0 and 10 degrees.

3. The drill for producing a deep hole according to claim 2, wherein when the outside dimension of the drill is D, a core thickness of the drill is greater than 0.3D.

4. The drill for producing a deep hole according to claim 3, wherein the guide section is provided with a diamond edge.

5. The drill for producing a deep hole according to claim 2, wherein the guide section is provided with a diamond edge.

6. The drill for producing a deep hole according to claim 1, wherein when the outside dimension of the drill is D, a core thickness of the drill is greater than 0.3D.

7. The drill for producing a deep hole according to claim 6, wherein the guide section is provided with a diamond edge.

8. The drill for producing a deep hole according to claim 1, wherein the guide section is provided with a diamond edge.

* * * * *